(12) United States Patent
Louz-On

(10) Patent No.: US 7,886,032 B1
(45) Date of Patent: Feb. 8, 2011

(54) CONTENT RETRIEVAL FROM SITES THAT USE SESSION IDENTIFIERS

(75) Inventor: Michal Louz-On, Philadelphia, PA (US)

(73) Assignee: Google Inc., Mountain View, CA (US)

( * ) Notice: Subject to any disclaimer, the term of this patent is extended or adjusted under 35 U.S.C. 154(b) by 1071 days.

(21) Appl. No.: 10/743,547

(22) Filed: Dec. 23, 2003

(51) Int. Cl.
G06F 15/173 (2006.01)
G06F 15/16 (2006.01)

(52) U.S. Cl. .................. 709/223; 709/217; 709/224

(58) Field of Classification Search .............. 709/223, 709/225, 226, 227, 228, 229, 230; 705/35
See application file for complete search history.

(56) References Cited

U.S. PATENT DOCUMENTS

| | | | |
|---|---|---|---|
| 6,665,658 B1 | 12/2003 | DaCosta et al. ................ 707/3 |
| 6,952,730 B1* | 10/2005 | Najork et al. ............... 709/225 |
| 2002/0007411 A1* | 1/2002 | Shaked et al. .............. 709/229 |
| 2002/0143717 A1* | 10/2002 | Landt ......................... 706/12 |
| 2003/0018779 A1 | 1/2003 | Hughes et al. .............. 709/224 |
| 2003/0167236 A1* | 9/2003 | Stefik et al. .................. 705/51 |
| 2004/0117349 A1* | 6/2004 | Moricz .......................... 707/1 |
| 2004/0133848 A1* | 7/2004 | Hunt et al. .................. 715/500 |
| 2004/0158429 A1* | 8/2004 | Bary et al. .................. 702/183 |
| 2004/0177015 A1* | 9/2004 | Galai et al. ................... 705/35 |
| 2006/0059025 A1* | 3/2006 | Kato et al. ..................... 705/5 |
| 2006/0155862 A1* | 7/2006 | Kathi et al. ................. 709/229 |
| 2007/0112960 A1* | 5/2007 | Joy et al. .................... 709/224 |
| 2008/0052169 A1* | 2/2008 | O'Shea et al. ................ 705/14 |
| 2008/0201344 A1* | 8/2008 | Levergood et al. .......... 707/100 |
| 2009/0075642 A1* | 3/2009 | Rantapuska et al. ....... 455/422.1 |
| 2009/0265463 A1* | 10/2009 | Greifeneder et al. ........ 709/224 |

FOREIGN PATENT DOCUMENTS

WO WO 03017023 A2 2/2003 ................. 707/35

OTHER PUBLICATIONS

Applicant's specification, background of invention par 0002-0008.*
Applicant's specification U.S. Appl. No. 10/743,547 pp. 1-2, pp. 13.*
K. Yee, "Text-Search Fragment Identifiers" Mar. 2, 1998,, "Network Working Group", pp. 1-8.*
Miller et al., "SPHINX: A Framework for Creating Personal, Site-Specific Web Crawlers", Proceedings of the Seventh International World Wide Web Conference, Brisbane, Australia, Apr. 1998, p. 1-13.
Seda, C., "Making Dynamic and E-Commerce Sites Search Engine Friendly", Search Engine Watch, http://searchenginewatch.com/searchday/article.php/2161, published Oct. 29, 2002, p. 1-5.
Quigo, Inc., "Quigo, Inc. Unveils Deep Web Search Technologies", press release dated Aug. 15, 2001, p. 1-2.

(Continued)

Primary Examiner—Karen C Tang
(74) Attorney, Agent, or Firm—Harrity & Harrity, LLP

(57) ABSTRACT

Session identifiers are automatically identified in uniform resource locators (URLs). The session identifiers may be identified using classification techniques based on whether identical sub-strings are identified in multiple URLs downloaded from a web site. The URLs may then have the session identifiers extracted to generate clean versions of the URLs.

22 Claims, 7 Drawing Sheets

OTHER PUBLICATIONS

Search Tools Consulting, www.searchtools.com, "Generating Simple URLs for Search Engines", Jul. 2003, p. 1-6.
Sun Microsystems, The Java Tutorial, including sections on "Session Tracking", "Working with URLs", and "Parsing a URL", p. 1-9.
Loke et al., "Logic Programming with the World-Wide Web", p. 235-245, Hypertext 1996, ACM.
Verity Ultraseek, Support FAQ #1037, created Jan. 2002, p. 1-2.
DeRoure, et al., "Investigating Link Service Infrastructures", copyright 2000, ACM, p. 67-76.
Co-pending U.S. Appl. No. 10/672,248, filed Sep. 29, 2003, entitled: "Identification of Web Sites that Contain Session Identifiers," 27 page specification, 8 sheets of drawings.

* cited by examiner

CONTENT RETRIEVAL FROM SITES THAT USE SESSION IDENTIFIERS

BACKGROUND OF THE INVENTION

A. Field of the Invention

The present invention relates generally to content retrieval on the world wide web, and more particularly, to automated web crawling.

B. Description of the Related Art

The World Wide Web ("web") contains a vast amount of information. Search engines assist users in locating desired portions of this information by cataloging web pages. Typically, in response to a user's request, the search engine returns references to documents relevant to the request.

Search engines may base their determination of the user's interest on search terms (called a search query) entered by the user. The goal of the search engine is to identify links to high quality relevant results based on the search query. Typically, the search engine accomplishes this by matching the terms in the search query to a corpus of pre-stored web documents. Web documents that contain the user's search terms are considered "hits" and are returned to the user.

The corpus of pre-stored web documents may be stored by the search engine as an index of terms found in the web pages. Documents that are to be added to the index may be automatically located by a program, sometimes referred to as a "spider," that automatically traverses ("crawls") web documents based on the uniform resource locators (URLs) contained in the web documents. Thus, for example, a spider program may, starting at a given web page, download the page, index the page, and gather all the URLs present in the page. The spider program may then repeat this process for the web pages referred to by the URLs. In this way, the spider program "crawls" the world wide web based on its link structure.

Some web sites track users as they download different pages on the web site. User tracking is useful for identifying user behavior, such as identifying purchasing behavior by tracking the user through various web site page requests on a shopping orientated web site.

Two methods are commonly used to track user behavior: use of cookies to maintain information and embedding session identifiers in the uniform resource locators (URLs) in the web pages presented to the user. An embedded session identifier, in particular, may include a string of random characters embedded in the URLs returned to the user. When the user selects one of the URLs, the embedded identifier is returned to the web server in the request for the web page. The identifier can then be used to track the web pages presented to the user.

Embedding session identifiers in a web page, although potentially useful to the web site owner, poses problems to automated web spiders. Because the spider identifies pages based on their URLs, embedding session identifiers in a URL can cause the underlying web page to appear to be different to the spider each time a new session identifier is embedded in the URL. This can, in turn, cause the spider to repeatedly crawl the same web page, thus limiting the spiders ability to crawl all possible sites.

Thus, there is a need in the art to more effectively crawl web sites that embed session identifiers in URLs.

SUMMARY OF THE INVENTION

The present invention is directed to techniques for identifying and using session identifiers in web documents.

One aspect of the invention is directed to a method of crawling documents. The method includes extracting a set of uniform resource locators (URLs) from at least one document and analyzing the extracted set of URLs to determine those in the set of URLs that contain session identifiers. The method further includes generating a clean set of URLs from the extracted set of URLs using the session identifiers and determining when at least one second URL has already been crawled based, at least in part, on a comparison of the second URL to the clean set of URLs.

Another aspect of the invention is directed to a method for receiving a set of uniform resource locators (URLs). The method includes analyzing the set of URLs for sub-strings that are consistent with session identifiers. The method additionally includes further analyzing the set of URLs to identify those of the sub-strings as corresponding to session identifiers based on multiple occurrences of a sub-string in the set of URLs.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The detailed description does not limit the invention.

As described herein, session identifiers are identified for a web host. URLs that contain the session identifiers may have the session identifier removed to generate "clean" URLs. The clean versions of the URLs can be used to identify the content corresponding to the URL.

Exemplary Network Overview

Figure 1:
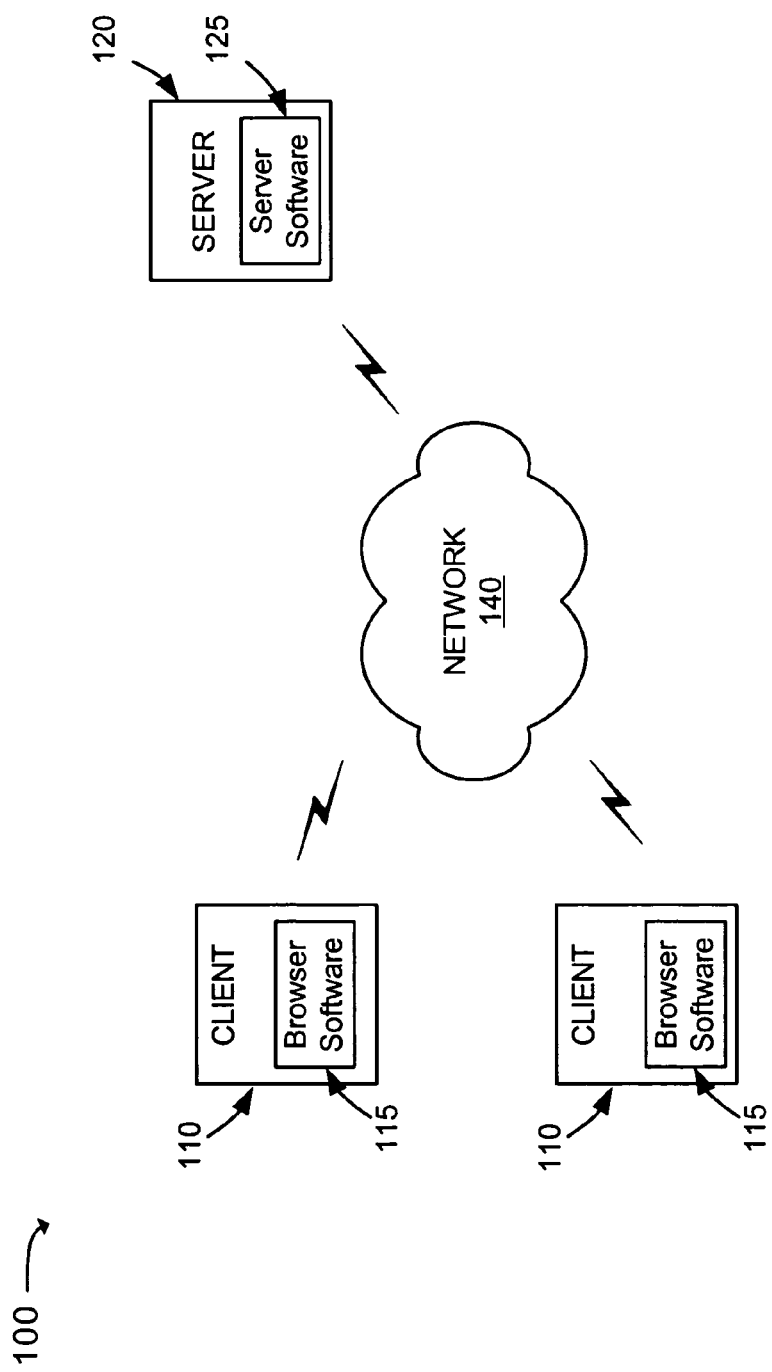
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include multiple clients 110 connected to one or more servers 120 via a network 140. Network 140 may include a local area network (LAN), a wide area network (WAN), a telephone network, such as the Public Switched Telephone Network (PSTN), an intranet, the Internet, or a combination of networks. Two clients 110 and a server 120 have been illustrated as connected to network 140 for simplicity. In practice, there may be more or fewer clients and servers. Also, in some instances, a client may perform the functions of a server and a server may perform the functions of a client.

Clients 110 may include client entities. An entity may be defined as a device, such as a wireless telephone, a personal computer, a personal digital assistant (PDA), a lap top, or another type of computation or communication device, a thread or process running on one of these devices, and/or an object executable by one of these device. Server 120 may include server entities that process, search, and/or maintain documents in a manner consistent with the principles of the invention. Clients 110 and server 120 may connect to network 140 via wired, wireless, or optical connections.

Clients 110 may include client software such as browser software 115. Browser software 115 may include a web browser such as the existing Microsoft Internet Explorer or Netscape Navigator browsers. For example, when network 140 is the Internet, clients 110 may navigate the web via browsers 115.

Server 120 may operate as a web server and include appropriate web server software 125. In one implementation, web server software 125 may function as a search engine, such as a query-based web page search engine. In general, in response to client requests, search engine 125 may return sets of documents to clients 110. The documents may be returned to clients 110 as a web page containing a list of links to web pages that are relevant to the search query. This list of links may be ranked and displayed in an order based on the search engine's determination of relevance to the search query. Although server 120 is illustrated as a single entity, in practice, server 120 may be implemented as a number of server devices.

A document, as the term is used herein, is to be broadly interpreted to include any machine-readable and machine-storable work product. A document may be an email, a file, a combination of files, one or more files with embedded links to other files, a news group posting, a web advertisement, etc. In the context of the Internet, a common document is a Web page. Web pages often include content and may include embedded information (such as meta information, hyperlinks, etc.) and/or embedded instructions (such as Javascript, etc.).

Exemplary Client/Server Architecture

Figure 2:
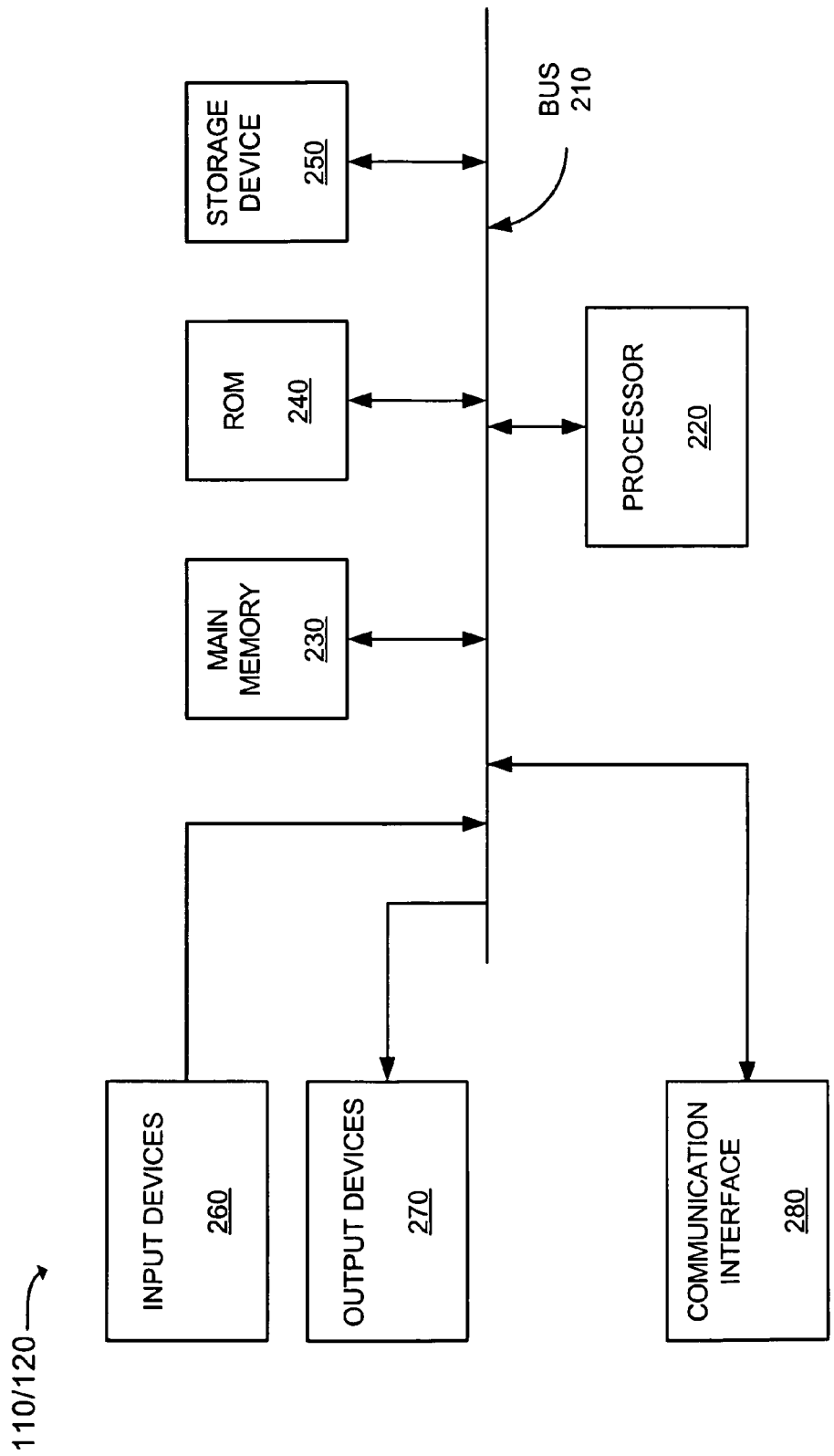
FIG. 2 is an exemplary diagram of a client or server device according to an implementation consistent with the principles of the invention.

FIG. 2 is an exemplary diagram of a client 110 or server 120 according to an implementation consistent with the principles of the invention. Client/server 110/120 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of client/server 110/120.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit a user to input information to client/server 110/120, such as a keyboard, a mouse, a pen, voice recognition and/or biometric mechanisms, etc. Output device(s) 270 may include one or more conventional mechanisms that output information to the user, including a display, a printer, a speaker, etc. Communication interface 280 may include any transceiver-like mechanism that enables client 110 to communicate with other devices and/or systems. For example, communication interface 280 may include mechanisms for communicating with another device or system via a network, such as network 140.

The software instructions defining server software 125 and browser software 115 may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the present invention. Thus, implementations consistent with the principles of the invention are not limited to any specific combination of hardware circuitry and software.

As mentioned, server software 125 may implement a search engine that, based on a user query, returns a list of links to documents that the server software 125 considers to be relevant to the search.

Server Software 125

Figure 3:
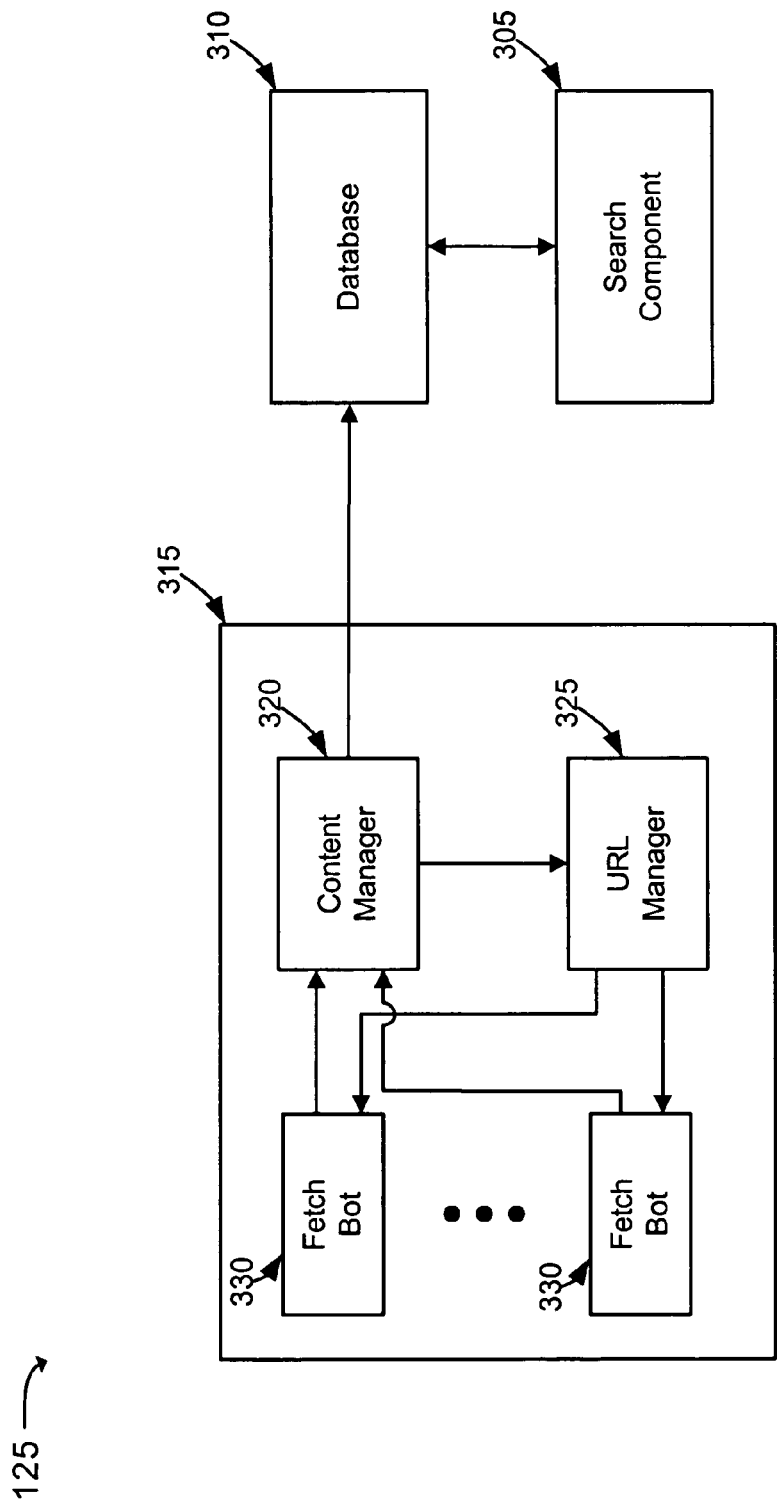
FIG. 3 is an exemplary functional block diagram illustrating an implementation of the server software shown in FIG. 1.

FIG. 3 is an exemplary functional block diagram illustrating an implementation of server software 125. Server software 125 may include a search component 305, a database component 310, and a spider component 315. In general, search component 305 may receive user search queries from clients 110, search database 310 based on the search queries, and return a list of links (e.g., URLs) of relevant documents to the client 110. The list of links may also include information that generally attempts to describe the contents of the web documents associated with the links. The list of links may be ordered based on ranking values, generated by search component 305, which rates the links based on relevance.

Database component 310 may store an index of the web documents that have been crawled by spider program 315. In one implementation, the index of the web documents may be an inverted index. Database component 310 may be updated as new web documents are crawled and added to database component 310. Database component 310 may be accessed by search component 305 when responding to user search queries.

Spider component 315 may crawl documents available through network 140. Spider component 315 may include content manager 320, URL manager 325, and fetch bots 330. In general, fetch bots 330 may download content referenced by URLs. The URLs that are to be downloaded may be given to fetch bots 330 by URL manager 325. URL manager 325 may keep track of the URLs that have been downloaded and what URLs are to be downloaded. URL manager 325 may generate a "fingerprint" of each URL it receives by, for example, applying a hash function to the URL. The fingerprint can be used to quickly identify if a later-received URL is identical to one previously downloaded. Content manager 320 may receive content downloaded by fetch bots 330 and destined for database component 310. Content manager 320 may process the content to extract URLs. The content may be forwarded to database component 310. URLs may be forwarded from content manager 320 to URL manager 325 and possibly to database component 310. The operation of content manager 320, URL manager 325, and fetch bots 330 consistent with aspects of the invention will be described in more detail below.

Although search component 305, database component 310, and spider component 315 are illustrated in FIG. 3 as all being part of server software 125, one of ordinary skill in the art will recognize that these components could be implemented on separate computing devices or clusters of computing devices. Spider component 315 and search component 305, in particular, may be implemented independently of one another.

Figure 4:
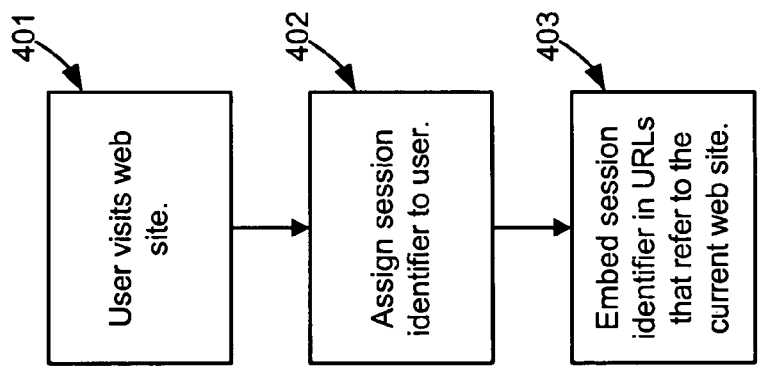
FIG. 4 is a flow chart illustrating the use of session identifiers by a web server.

Before describing the operation of spider component 315 in greater detail, it may be helpful to describe the way in which session identifiers are commonly used. FIG. 4 is a flow chart illustrating the use of session identifiers by a web server. As mentioned, session identifiers may be used to track the user of a client 110 as the user interacts with a particular host web site.

A user may begin by browsing a web site using browser software 115 (act 401). The web site may assign a session identifier to the user (act 402). The session identifier may be, for example, a string of characters, such as any string of characters that does not directly reference content. A web site that uses session identifiers to track user actions is typically a web site that includes multiple different possible web pages to which the user may navigate. A web shopping site, for instance, may contain hundreds or thousands of possible web pages to which the user may navigate. Typically, after accessing the main web page for the shopping site, the user will navigate to other web pages in the shopping site by selecting URLs on the main web page or from later served web pages. When the user accesses the main web page for the web site, the web site may initially redirect the user to an alternate version of the main web page in which a session identifier is assigned to the user. For each additional web page returned to the user, the web site may include the session identifier in the URLs that point to other web pages on the web site (act 403). When the user attempts to access one of these URLs, the web site uses the session identifier to identify the user with the user's previous site accesses.

Figure 5:
FIG. 5 is a diagram illustrating a series of exemplary URLs that include session identifiers.

FIG. 5 is a diagram illustrating a series of exemplary URLs that include session identifiers. A number of URLs 501-504 are illustrated in FIG. 5. In this example, URLs 501-504 are URLs embedded in a web page for "somecompany.com." Each URL includes a session identifier 510 ("12341234"). If the user selects URL 502, for instance, the user's browser program 115 may contact "somecompany.com" and request the web page "/12341234/otherpage.htm." The "somecompany.com" web site may use session identifier 510, which the web server uses to identify the user's session. The web server also returns the content of the web page, "otherpage.htm." The URLs within "otherpage.htm" that refer to other web pages at "somecompany.com" may also contain session identifier 510.

Although session identifiers were described above as a specially inserted strings of characters, in general, any portion of a URL that doesn't reference content can be potentially used as a session identifier. Content, in this sense, does not necessarily mean that the web documents need to be exactly the same to be considered as having the same content. For example, web documents that are the same but for different color schemes, different advertisement links, or different navigation links may still be considered as having the same content.

Figure 6:
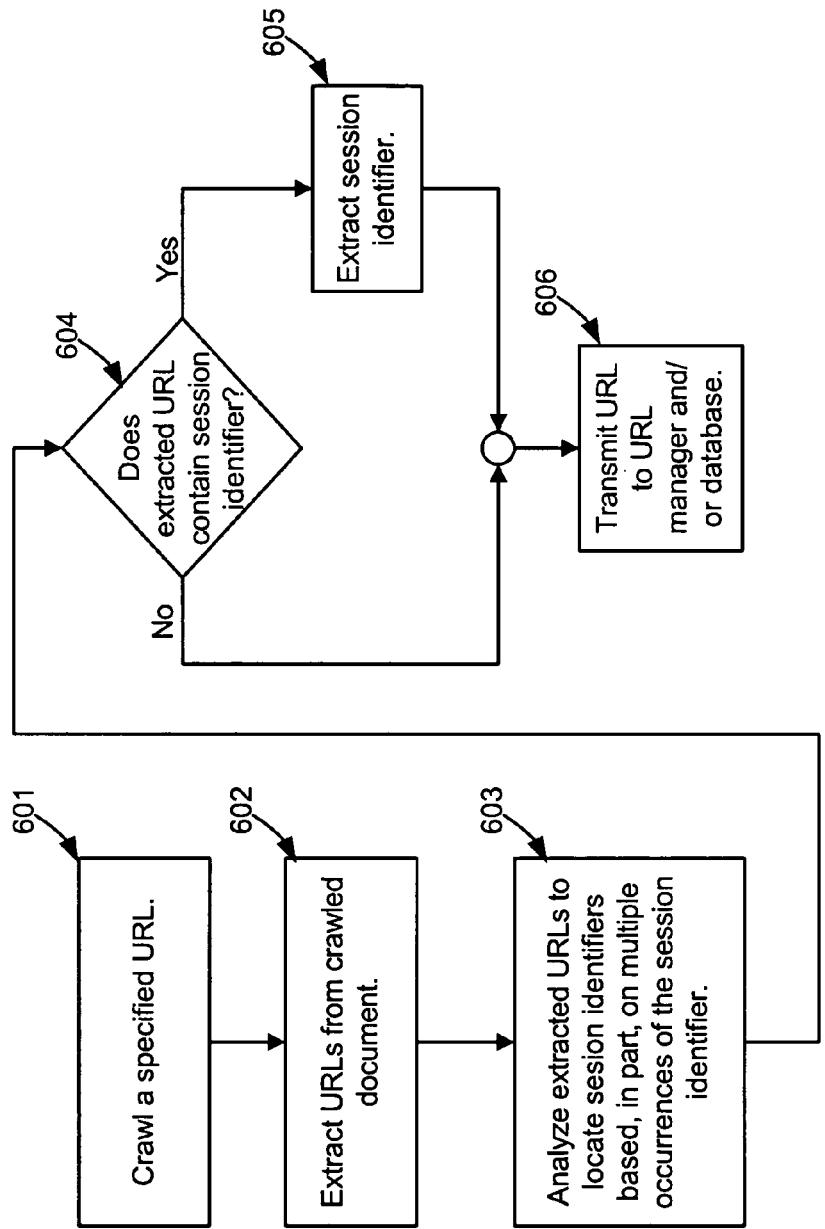
FIG. 6 is a diagram illustrating operations consistent with the invention through which a spider component may process URLs contained in downloaded web documents.

FIG. 6 is a diagram illustrating operations consistent with the invention through which spider component 315 may process URLs contained in downloaded web documents. In general, spider component 315 operates to remove session identifiers from URLs to thus generate a clean version of the URLs. The clean version of the URLs (or an identifier based on the clean version) may then be stored by URL manager 325.

A fetch bot 330 may begin by crawling (downloading) the content for a particular web document that is specified by a URL (act 601). The URL to crawl may be specified by URL manager 325. Content manager 320 may then extract the URLs from the web document (act 602). Content manager 320 may alternatively extract the URLs from multiple web documents associated with a single web host and handle the URLs from the multiple web documents as if they originated from a single web document.

Content manager 320 may analyze the set of extracted URLs for session identifiers (acts 603). Session identifiers may be identified by searching for strings that are structured in a manner consistent with session identifiers and that repeat across multiple URLs in the set of extracted URLs. For example, content manager 320 may initially look for sub-strings in the URLs in which the sub-string is not part of the URL domain name, contains a certain minimum number of characters (e.g., eight or more), and appears to be made of random characters. The randomness of a sub-string can be based on a comparison with terms from, for example, a dictionary. Or, for example, randomness can be estimated by keeping track of the number of times the string alternates between digits (0-9) lowercase alpha-numeric (a-z), and uppercase alpha-numeric (A-Z). For instance the string 3uSS4A has 4 such alternations, indicating a relatively high degree of randomness. Of these initially identified substrings, content manager 320 may classify a sub-string as a session identifier if the sub-string appears in multiple URLs in the set. One of ordinary skill in the art will recognize that a number of possible classification techniques are known in the art and could be used to initially locate the sub-strings in the URLs that are candidates for being session identifiers. Additionally, when classifying a sub-string as a session identifier based on multiple occurrences of the sub-string on a web site, additional factors, such as the general directory structure of the web site, may be taken into consideration.

For any URLs that contain session identifiers, content manager 320 may extract the session identifier from the URL (acts 604 and 605). With the session identifier extracted from the URL, the URL is a "clean" URL. The clean URL may be sent to URL manager 325, and possibly also to database 310 (act 606). In some implementations, a fingerprint of the URL, instead of or in addition to the actual URL, may be stored by URL manager 325. By storing clean URLs and comparing URLs based on their clean versions, URL manager 325 can determine when a URL has been previously crawled, even when the URL is one that was first identified with a session identifier.

Content manager 320 may additionally transmit the downloaded web documents to database 310. The URLs in the web documents transmitted to database 310 can be either the original URL or the clean version of the URL.

For some sites, to access the site, a session identifier is required, although the particular session identifier value does not matter. For other sites, the session identifier is required and must be a "valid" session identifier. Often, for these sites, a valid session identifier is defined as one that was previously issued by the web site.

When crawling network 140, if the site that is to be accessed is one that does not require a specific session identifier, URL manager 325 may generate a random session identifier that is defined to include a set of characters consistent with session identifiers generated by the web site. Thus, for these sites, when sending a URL to fetch bots 330, URL manager 325 may generate a session identifier and include it in the URL that is sent to fetch bots 330. However, for the purpose of storing the URLs and matching URLs that are later received in response to crawling the web, URL manager 325 may use the clean versions of the URLs.

For sites that require valid session identifiers, URL manager 325 may store and fingerprint the clean version of the URLs but use the URLs originally returned from the site when crawling additional documents on the site. In this situation, URL manager 325 may thus store the clean version of the URL and the session identifier. When the URL is needed for downloading purposes, URL manager 325 may substitute the session identifier back in the URL. Alternatively, URL manager 325 may store the originally received version of the URL and use the clean version of the URL for fingerprinting the URL. More generally, this technique of storing the originally downloaded version of the URLs but using the clean version for fingerprinting the URL may used for all sites when crawling the web.

Figure 7:
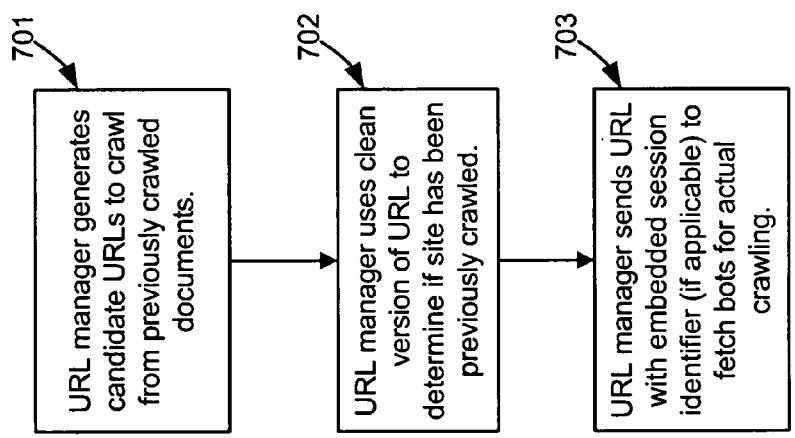
FIG. 7 is a flowchart illustrating operations for crawling the web consistent with aspects of the invention.

FIG. 7 is a flowchart illustrating operations for crawling the web consistent with aspects of the invention. URL manager 325 may begin by identifying candidate URLs to crawl from previously crawled documents (act 701). The candidate URLs may include any URLs that were previously extracted from downloaded web documents. Alternatively, candidate URLs could be externally input to URL manager 325.

URL manager 325 may determine if the candidate URLs have been previously crawled by comparing clean versions of the candidate URLs to clean URLs that were previously crawled (act 702). The comparison may be based on a fingerprint of the URLs.

Candidate URLs that URL manager 325 determines should be crawled may be transmitted to fetch bots 330 (act 703). The URLs may be given to fetch bots 330 with the original or synthesized session identifiers.

CONCLUSION

As discussed above, session identifiers can be automatically identified in documents based on, among other things, multiple occurrences of a session identifier in URLs from a web site.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that a person of ordinary skill in the art would be able to design software and control hardware to implement the aspects based on the description herein.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

What is claimed is:

1. A method perform by a computer system, the method comprising:
    extracting, by one or more processors associated with the computer system, a set of uniform resource locators (URLs) from one document or from multiple documents downloaded from a web site;
    identifying, by the one or more processors associated with the computer system, a sub-string occurring in the set of URLs as a session identifier, based on at least one of a plurality of rules and based on multiple occurrences of the sub-string occurring in the set of URLs;
    generating, by the one or more processors associated with the computer system, a clean set of URLs, derived from the set of URLs, by removing the session identifier;
    determining, by the one or more processors associated with the computer system, additional URLs that have already been crawled based on a comparison of a clean set of the additional URLs to the clean set of generated URLs; and
    where the clean set of the additional URLs is generated by removing another session identifier, or the identified session identifier, of the additional URLs.

2. The method of claim 1, where the comparison of the clean set of the additional URLs to the clean set of generated URLs comprises:
    calculating a first fingerprint value derive from the clean set of additional URLs and a second fingerprint value derive from the clean set of generated URLs, and where the comparison is based on a comparison of the first fingerprint value with the second fingerprint value.

3. The method of claim 1, where the at least one of plurality rules comprises:
    determining that the sub-string does not reference content.

4. The method of claim 1, where the at least one of plurality rules comprises:
    determining that the sub-string contains characters consistent with a session identifier.

5. The method of claim 1, further comprising:
    downloading content from the additional URLs when the additional URLS are determined to not already have been crawled.

6. The method of claim 1, further comprising:
    storing information based on the clean set of URLs for use in later determining whether the additional URLs have already been extracted; and
    storing the set of URLs, including embedded session identifiers, for use in later accessing the set of URLs.

7. The method of claim 1, where the at least one of the plurality rules comprises:
    determining that the sub-string exhibits at least a specified measure of randomness.

8. A method performed by a computer system, the method comprising:
    downloading, by a communication interface associated with the computer system, one or more documents from a web site;
    extracting, by one or more processors associated with the computer system, a set of uniform resource locators (URLs) from the downloaded one or more documents;
    identifying, by the one or more processor associated with the computer system, a sub-sting occurring in the extracted set of URLs as a session identifier, based on the sub-string having a structure consistent with session identifiers and based on multiple occurrences of the sub-string in the extracted set of URLs;

generating, by the one or more processors associated with the computer system, a clean set of URLs from the extracted set of URLs by removing the identified session identifier;

determining, by the one or more processors associated with the computer system, whether additional URLs have already been crawled based on a comparison of a clean set of the additional URLs to the generated clean set of URLs;

where the clean set of the additional URLs is generated by removing another session identifier, or the identified session identifier, of the additional URLs.

9. The method of claim 8, further comprising: storing the generated clean set of URLs.

10. The method of claim 9, further comprising:
adding a generated session identifier to in each of the generated clean set of URLs.

11. The method of claim 8, identifying the sub-sting occurring in the extracted set of URLs as a session identifier includes identifying the sub-string as having at least a specified measure of randomness.

12. A device comprising:
a memory to store instructions; and
a processor to execute the instructions to implement:
at least one fetch bot to download content on a network from a single web site;
extract URLs from the downloaded content;
identify a sub-string as a session identifier from the URLs extracted from the downloaded content based on at least one of a plurality rules and based on multiple occurrences of the sub-string in the extracted URLs;
create a clean set of URLs by removing the session identifier from the extracted URLs;
store the clean set of URLs; and
determine whether additional URLs have already been crawled based on a comparison of a clean set of the additional URLs to the created clean set of URLs, where the clean set of the additional URLs is generated by removing another session identifier, or the identified session identifier, from the additional URLs.

13. The device of claim 12, where the processor is further to identify the sub-string as a session identifier based on locating characters consistent with a session identifier in the URLs extracted from the downloaded content.

14. The device of claim 12, further comprising:
a database to store the downloaded content.

15. The device of claim 12, where the processor is further to determine whether the additional URLs have previously been stored by comparing the clean set of the additional URLs to the stored clean set of URLs.

16. The device of claim 12, where the session identifier includes characters from the extracted URLs that do not reference content.

17. The device of claim 12, where the processor is further to:

identify the session identifier from the extracted URLs based on identifying that the sub-string exhibits at least a specified measure of randomness.

18. A system comprising:
one or more server devices comprising one or more processors to:
download one or more documents from a web site;
extract a set of uniform resource locators (URLs) from the one or more documents downloaded from the website;
identify a sub-sting occurring in the set of URLs as session identifier, based on the sub-string including characters that are structured consistent with session identifiers and based on multiple occurrences of the sub-string in the set of URLs;
generate a clean set of URLs from the set of URLs by removing the identified sub-string;
determine whether additional URLs have already been crawled based on a comparison of a clean set of the additional URLs to the generated clean set of URLs;
where the clean set of the additional URLs are generated by removing another session identifier, or the identified session identifier, of the additional URLs.

19. The system of claim 18, where the one or more processors are further to:
add a generated session identifier to each URL in the generated clean set of URLs.

20. The system of claim 18, where the one or more processors are further to:
identify the sub-sting occurring in the set of URLs as a session identifier based on the sub-string having at least a specified measure of randomness.

21. One or more memory devices that include programming instructions executed by one or more processors, where the instructions causes the one or more processors to:
extract a set of uniform resource locators (URLs) from one document or from multiple document associated with a single web host;
identify, in the set of URLs, a sub-string as a session identifier based on the sub-string having at least a specified measure of randomness and based on multiple occurrences the sub-string in the extracted set of URLs; and
generate a clean set of URLs from the extracted set of URLs by removing the identified session identifier;
determine, by the one or more processors associated with the computer system, additional URLs have already been crawled based on a comparison of a clean set of the additional URLs to the clean set of URLs; wherein the clean set of the additional URLs are generated by removing another session identifier, or the identified session identifier, of the additional URLs.

22. The one or more memory devices of claim 21, further causes the one or more processors to:
add a generated session identifier to URLs in the clean set of URLs when the URLs are to be used to access a web document.

* * * * *